United States Patent
Hughes, Jr. et al.

(10) Patent No.: US 7,188,313 B2
(45) Date of Patent: Mar. 6, 2007

(54) CONTEXT SENSITIVE FONT GENERATION

(75) Inventors: Robert E. Hughes, Jr., Duluth, MN (US); Chadwick C. Coffey, Two Harbors, MN (US); Michael J. Flagg, San Diego, CA (US)

(73) Assignee: Hallmark Cards, Incorporated, Kansas, MO (US)

( * ) Notice: Subject to any disclaimer, the term of this patent is extended or adjusted under 35 U.S.C. 154(b) by 506 days.

(21) Appl. No.: 09/970,527

(22) Filed: Oct. 3, 2001

(65) Prior Publication Data
US 2004/0205677 A1 Oct. 14, 2004

(51) Int. Cl.
G06F 15/00 (2006.01)
(52) U.S. Cl. .................. 715/531; 715/542; 345/471; 345/467; 345/468
(58) Field of Classification Search ............... 345/150, 345/141, 471, 467, 468; 364/419.1; 382/186; 400/61; 178/2; 715/531, 542
See application file for complete search history.

(56) References Cited

U.S. PATENT DOCUMENTS

| 4,649,231 | A | * | 3/1987 | Marbet ................. 178/2 B |
| 4,817,034 | A | | 3/1989 | Hardin, Sr. et al. |
| 5,108,206 | A | * | 4/1992 | Yoshida ................. 400/61 |
| 5,295,238 | A | * | 3/1994 | Dickson ................. 345/471 |
| 5,327,342 | A | * | 7/1994 | Roy ..................... 345/467 |
| 5,412,771 | A | * | 5/1995 | Fenwick ................. 345/468 |
| 5,640,589 | A | | 6/1997 | Takayama et al. |
| 6,754,875 | B1 | * | 6/2004 | Paradies ................. 715/542 |

OTHER PUBLICATIONS

TrueType fundamentals, Microspft Typography, Nov. 16, 1997, pp. 1-17. available at <http://www.microsoft.com/opentype/otspec/ttch01.htm>.*
www.vLetter.com—vletter.com, Inc., pp. 1-27.

* cited by examiner

Primary Examiner—Heather R. Herndon
Assistant Examiner—Gautam Sain
(74) Attorney, Agent, or Firm—Fish & Richardson P.C.

(57) ABSTRACT

Programs, methods and apparatus for context sensitive font generation, especially handwriting fonts. In a preferred embodiment, a computer program product contains instructions to identify a character string including upper case, lower case, and/or symbolic characters; identify the first character in the string; identify a plurality of handwritten glyphs corresponding to the character; select one of the glyphs based upon an adjacent character in the string; and repeat the foregoing steps, thereby converting the character string.

26 Claims, 4 Drawing Sheets

As we close another year, I wait to take this opportunity to thank you for being a part of XYZ. It's been a challenging year for our company and a sad time for our nation. I am optimistic that our collective strength and spirit will lead both XYZ and our country forward.
May the new year be happy, healthy and peaceful for you, your family and our nation.

As we close another year, I wait to take this opportunity to thank you for being a part of XYZ. It's been a challenging year for our company and a sad time for our nation. I am optimistic that our collective strength and spirit will lead both XYZ and our country forward.

May the new year be happy, healthy and peaceful for you, your family and our nation.

400

Jay

FIG. 4

CONTEXT SENSITIVE FONT GENERATION

TECHNICAL FIELD

The invention relates to text processing, and more particularly to methods and apparatus for creating fonts that are customized such that they have an improved appearance. Often such fonts are used in the production of "handwriting fonts," such as cursive scripts, that are intended to have natural, realistic appearances.

BACKGROUND

Word processing software typically implements an array of fonts that can be applied by the user to selected text. Each font gives the text a distinctive appearance. However, most fonts are fundamentally merely variants of the basic Courier font used since the advent of typewriters. Accordingly, such fonts are readily recognizable as word processing fonts. Recipients of materials prepared with those fonts typically appreciate that the materials were produced with a word processor or similar equipment.

On the other hand, some fonts have a scripted or printed style akin to handwriting. Such "handwriting fonts" attempt to imbue the printed text with the appearance of being handwritten. Many handwriting fonts fail to achieve this objective because the text still has, among other things, a rigid, linear and perfectly uniform appearance. Each of those attributes detracts from the naturalness and realism of the simulated handwriting.

Accordingly, methods have been developed to improve the appearance of handwriting fonts by making them aberrant, nonlinear or non-uniform in some respect. One method accepts as input an array of script characters, either from a handwriting sample or a programmer-developed font array. The leading and trailing ligatures of each character are examined, and the characters are grouped by ligature type: null, lower, upper, or diagonal. Appearance values are assigned to each ligature in a group, and an average ligature appearance value is determined. The ligatures in each class are reconfigured to have the corresponding average ligature appearance. Glyphs from a person's actual handwriting can thus be joined together to form character strings.

Other methods attempt to create handwriting that appears natural by developing a set of curved connectors for a given set of cursive characters. Each character includes a letter and an associated space. The characters in a text string are thus separated by spaces. Connectors are developed to bridge each combination and permutation of characters. The font is created by inserting the appropriate connectors between the cursive letters.

Still other techniques involve databases or "dictionaries" of handwritten character strings and letters. Character strings in a document are compared to the database and, where a combinational match is found, the dictionary string is substituted for the string in the document. Remaining letters are replaced with the handwritten letters in the dictionary. Connections between the individual letters and dictionary strings are created by application of curve fitting algorithms. Such algorithms extrapolate a "best fit" curve to connect adjacent characters based on each ligature's vector.

An improvement upon the foregoing methods is disclosed in co-pending U.S. application Ser. No. 09/342,858, entitled "Method of Producing Natural Handwriting," filed Jun. 29, 1999, which is incorporated herein by reference. According to the described techniques, a baseline is established for each line of text, and positions each word or character of the line of text at a particular position with respect to the baseline for the line containing the word. A word or character may be positioned on, above, or below the baseline, for instance, by inserting an advance code in the text document before the word or character. The resulting character strings thus undulate above and below the horizontal baseline, as real handwriting. The artificial linearity of previous handwriting fonts is accordingly avoided.

SUMMARY

The invention is directed to a system, method, and computer-readable medium for creating context-sensitive fonts. In the preferred embodiments, a computer program product identifies a character string and converts each character to a different font based on the attributes of the adjacent characters. In one particular embodiment, a computer program product contains instructions to identify a character string including upper case, lower case, and/or symbolic characters; identify the first character in the string; identify a plurality of handwritten glyphs corresponding to the character; select one of the glyphs based upon an adjacent character in the string; and repeat the foregoing steps, thereby converting the character string.

In certain embodiments, different handwritten glyphs can be associated with each character so that each occurrence of a character is mapped randomly to one of the associated glyphs. The program can also be configured to ensure that two adjacent identical characters are mapped to a different one of the associated glyphs.

In an additional embodiment, adjacent upper case characters can be mapped to printed upper case glyphs (rather than script upper case glyphs) to more accurately simulate how acronyms and the like are typically written.

In a further embodiment, symbols can be mapped based on the character preceding and/or succeeding the symbol. For example, a single quote can be mapped to an opening quote if there is a space preceding it, to an apostrophe where there is no space preceding or succeeding, and to a closed quote where there is no space preceding but a space succeeding.

Various embodiments of the invention can be implemented to realize one or more of the following advantages. Certain embodiments permit the mapping of characters in context-sensitive manner, which in turn creates adaptable fonts that customize themselves based on the particular usage. The invention can also be advantageously employed to create handwriting fonts having a realistic, non-uniform appearance. The invention can also be advantageously implemented to create handwriting fonts that include an increased degree of intra-word font variation, thereby giving the font an even more natural appearance. Many embodiments can obviate the need to incorporate other handwriting simulation protocols such as appearance averaging of ligatures or curve fitting algorithms. Certain embodiments require significantly less processing time than alternate methodologies, including in particular curve-fitting algorithms. Many embodiments can be freely combined where desired with complementary protocols, such as the variable baseline techniques, appearance averaging methods or curve-fitting algorithms, to create a handwriting font having an optimally realistic appearance.

The details of one or more embodiments of the present invention are set forth in the accompanying drawings and the description below. Other features and advantages of the present invention will be apparent from the description and drawings, and from the claims.

BRIEF DESCRIPTION OF THE DRAWINGS

FIG. 4 is a representative text string after conversion according to the algorithm of FIG. 2.

Like reference symbols in the various drawings indicate like elements.

DETAILED DESCRIPTION OF ILLUSTRATIVE EMBODIMENTS

Figure 1:
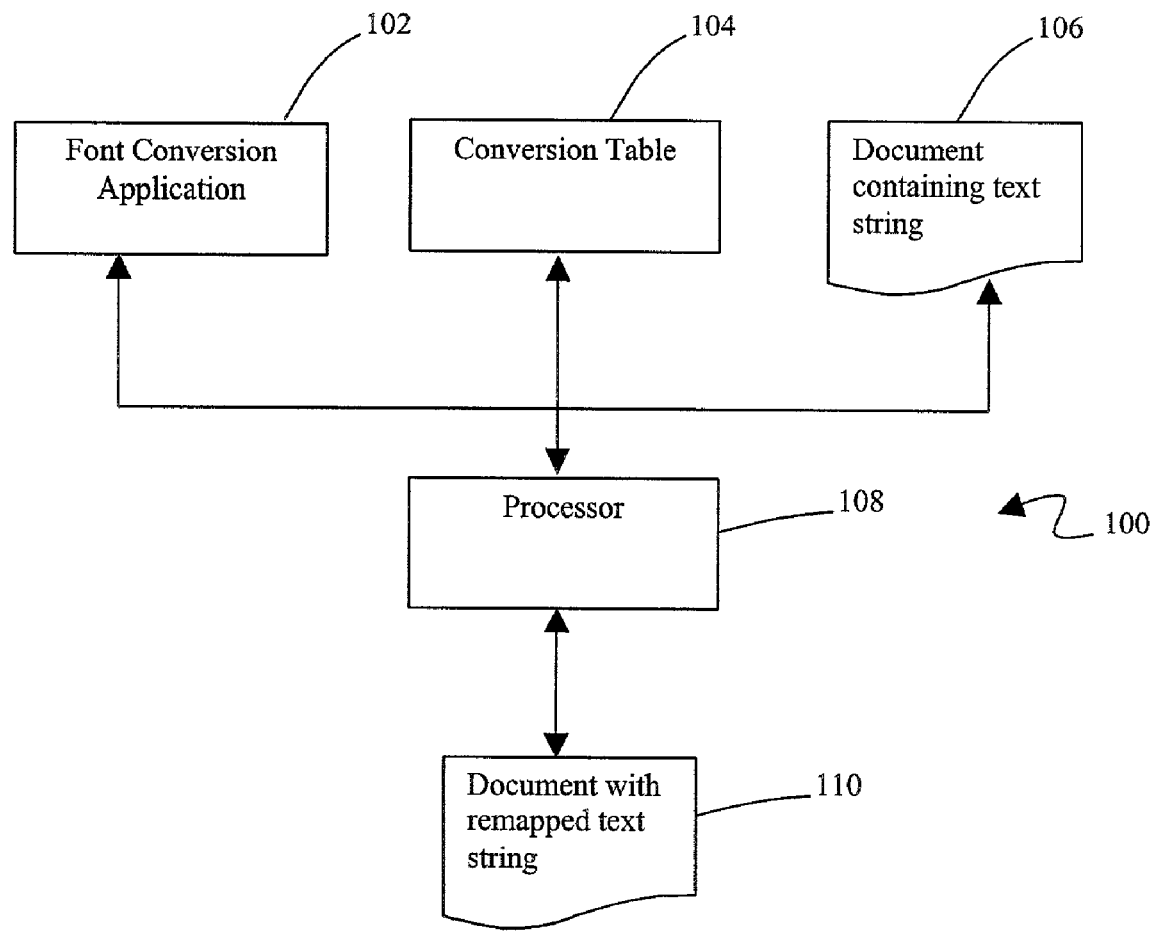
FIG. 1 is a block diagram illustrating a method of the present invention.

Referring now to the drawings, and first to FIG. 1, a system according to the present invention is designated generally by the numeral 100. System 100 includes a processor 108 programmed according to the present invention. Processor 108 is adapted to convert a document 106, which is a text document, into a reformatted, font converted document 110. As will be explained in detail hereinafter, processor 108 calls a font conversion application 102 to convert document 106 to a font-converted document 110. Then, the font-converted document is reformatted to have a more natural handwritten appearance. Preferably, processor 108 accesses a conversion table 104 to identify the fonts to which each character is remapped.

In the preferred embodiment, the method of the present invention is implemented in a personal computer environment. A document is created with a word processing system, such as WordPerfect™ or Microsoft Word™. The method of the present invention uses a combination of a database, such as Microsoft Access™, a word processor, such as Microsoft Word™ formatted with Visual Basic for Applications (VBA) programming, and a custom-designed dynamic linked library (DLL) for converting text to handwriting. In the preferred embodiment, handwriting conversion is preferably provided by SigSoft Handwriter™, which is available from Signature software, Inc., Hood River, Oreg., and disclosed in Fenwick, U.S. Pat. No. 5,412,771, which is incorporated herein by reference.

According to the present invention, text is stored in a document, and font information is stored in a conversion table. The method of the present invention is preferably run from within the word processing application. Visual Basic for Applications in the word processing application connects to the database table using data access objects to apply the formatting information to a particular document.

The fonts set forth in table 104 can be derived from a handwritten sample, specified by a user, or randomly generated by an appropriate algorithm. Preferably, the table 104 includes glyphs, or handwritten characters, derived from a person's actual handwriting. The table associates the characters with various upper case and lower case glyphs and also with glyphs corresponding to symbols such as single and double quotation marks. In a preferred embodiment, each Arabic character, such as "A," "B," "C," etc., is associated with an upper case script glyph, an upper case printed glyph, a leading lower case glyph with a leading ligature (where the origin handwriting sample has a leading ligature), and three middle lower case glyphs without leading ligatures. In fonts composed of 256 characters, the foregoing arrangement can omit six characters from one of the three lower case glyph sets. The single quote character is associated with an open quote glyph, a closed quote glyph, and an apostrophe glyph. The double quote character is associated with an open quote glyph, a closed quote glyph.

Figure 2:
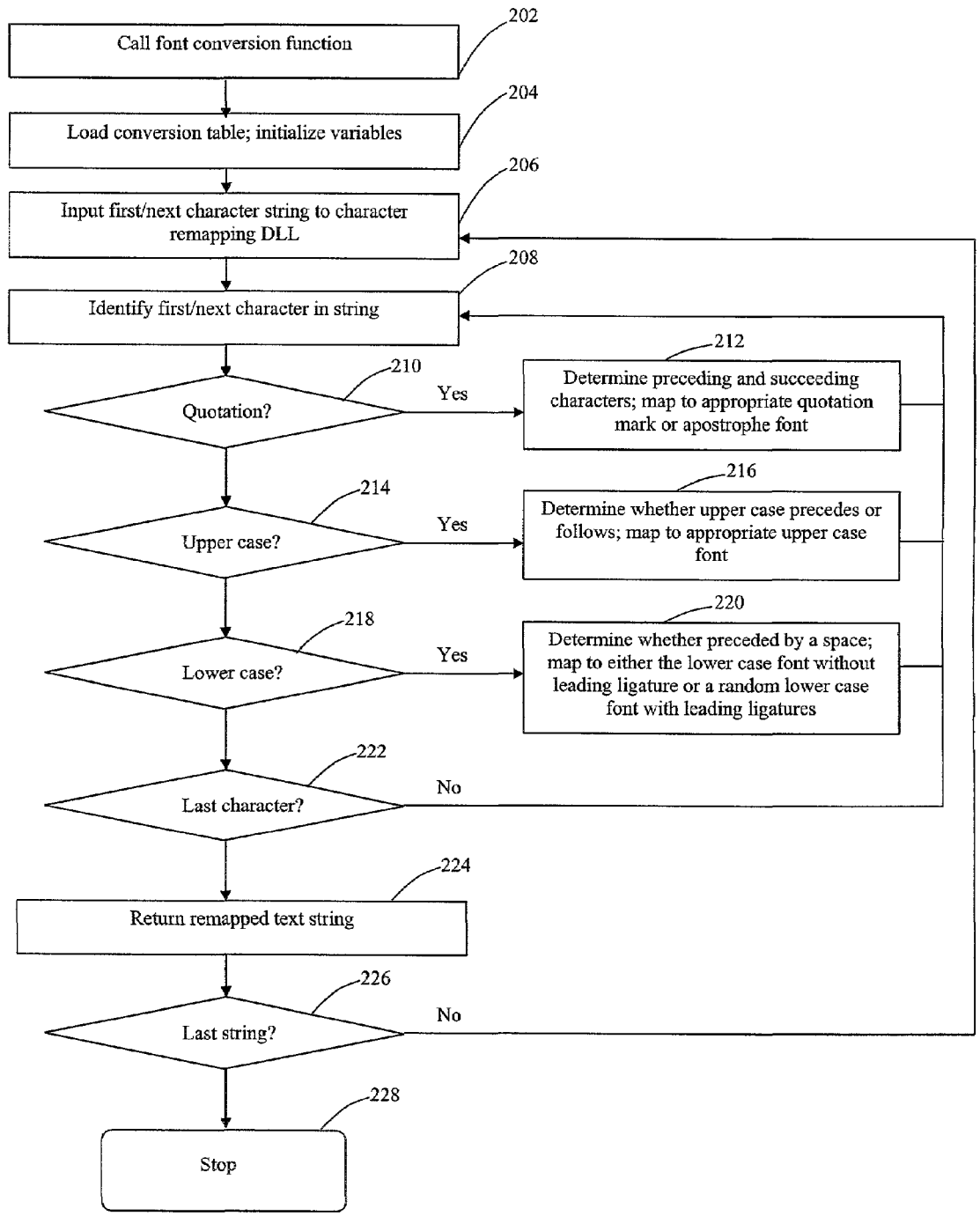
FIG. 2 is a flow diagram illustrating a technique for re-mapping an input string with a context-sensitive font.

FIG. 2 illustrates a preferred method wherein a character string is remapped, one character at a time, to glyphs in the conversion table 104. The technique is sensitive to the characters that precede and follow each target character and accordingly outputs text that has a realistic, handwritten appearance. The method is initiated by the input of a character string into a character remapping dynamic link library, or DLL. The program identifies the first or next character. The character is examined to determine if it is a quotation mark. If so, the character is mapped to the associated open quote, closed quote or apostrophe glyph, depending whether spaces or characters precede and/or succeed the quotation mark. Next, the method determines whether the character is upper case. If so, the method next determines whether an adjacent character is also an uppercase character (for the first character in a string, the determination is always negative, although in successive passes this might not be the case). If the adjacent character is also an uppercase character, both adjacent characters are mapped to the uppercase printed glyph in table 104. Otherwise, the character is mapped to the uppercase script glyph in table 104. The technique next assesses whether the character is lower case and, if so, whether a space precedes the character. Lower case characters succeeding a space are mapped to the associated lower case glyph without a leading ligature. Otherwise, the lower case character is randomly mapped to one of the remaining three associated glyphs having both leading and trailing ligatures. However, the method ensures that two successive characters of the same type, such as two A's, are not assigned the same lower case glyph. Once all of the characters are converted, the remapped string is returned to the host word processing program.

Steps 202–228 of FIG. 2 will now be described in more detail. The word processing program calls the font conversion application, the character remapping DLL (202). The DLL can be called dynamically as the user inputs each character, upon entry of a space at a hard carriage return, at a time selected by the user, or at any other suitable interval or periodicity. Calling the conversion application as the user types each character has the advantage that the remapping can be made invisible to the user. However, processing time requirements are increased by implementation of such a protocol. Calling the font conversion DLL upon entry of a hard carriage return can strike a useful balance between real time conversion into handwriting font and conservation of processing resources.

When the conversion application is called, the conversion table 104 is loaded and suitable variables are initialized for the association of each character in the user-input string to a plurality of corresponding glyphs (204). For example, in a preferred embodiment, each Arabic character is associated with a library of six different glyphs, two upper case and four lower case. However, a larger number of glyphs may be associated with each character to provide any desired degree of variability and realism. Naturally the size and complexity of the conversion table 104 and the associated variable initializations increase as more glyphs are associated with each character. Moreover, the table 104 need not contain glyphs associated with every character. In a preferred embodiment, symbols other than quotation marks are not provided with associated glyphs. Rather, such characters are not remapped, as is explained further below.

A first text string is input into the conversion application (206) and the program identifies the first character in the string (208). The program returns to step 206 upon completing the remapping of a string and to step 208 upon completion of the mapping of a character, as will be described in more detail hereinbelow.

It is determined whether the character corresponds to a quotation mark (210). If it does, the program enters a subroutine that determines whether the character is a single or double quotation mark and whether spaces or characters preceded and follow the quotation mark (212). If the character is a single quotation mark preceded by a space, the character is mapped to an open quotation mark. If the character is a single quotation mark preceded by a character and followed by a space, the character is mapped to a closed quotation glyph. If the character is a single quotation mark preceded by a character and followed by a character, the character is mapped to an apostrophe or an apostrophe glyph. Assuming the character is a quotation mark, the remapped character is written to a temporary string and the program returns to step 208.

Otherwise, the program determines whether the character is upper case (214). If so, the characters preceding and following the character are also identified (216). If either is an upper case character, the adjacent upper case characters are remapped to the upper case printed glyph to simulate how acronyms and the like are typically handwritten. Otherwise, the upper case character is mapped to the upper case script glyph. In either event, the appropriate glyph is added to the temporary string and the program returns to step 208. If the character was not an upper case character the program proceeds to step 218.

In step 218, the program determines whether the character is lower case (218). In a preferred embodiment, symbols are not classified as lower case characters. If the character is lower case, the program then determines the preceding character. If the preceding character is a space, the character is mapped to the lower case glyph with leading ligature. If the preceding character is not a space, the character is mapped randomly to one of the three remaining lower case glyphs (i.e. those without leading ligatures). The subroutine then checks whether the preceding character happens to be the same character mapped to the same lower case glyph. If that is the case, the random assignment protocol is repeated and rechecked until the glyphs of the adjacent characters do not match. Here again, the remapped lower case character is added to the temporary string and the program returns to step 208.

If the character is a symbol other than a quotation mark, none of the foregoing subroutines (210, 214, 218) would have been triggered. Rather, the symbol "passes through" the conversion function. The program then returns to step 208 if there are any more characters remaining in the string.

When the end of the string is reached, the input string can be overwritten with the temporary string containing the remapped characters or the temporary string can be maintained (224). Either can be returned to the word processing program at this point. Alternately, the string can be held so that other remapped strings can be appended.

In a preferred embodiment, the conversion function is called upon the entry of a hard return. In such an embodiment, there are typically numerous strings of text comprising a paragraph that must be converted before the set of strings is returned to the word processing program. Accordingly, the protocol can advantageously determine whether the other strings have been input to the conversion function. As shown in step 226, the program returns to step 206 if further strings are ready for conversion. The procedures of steps 208–224 are repeated until all input strings have been converted.

At that point, the conversion function is complete and the remapped strings are returned to the word processing program. The word processor can then display the remapped strings, print them, or provide them to another function or program.

In the preferred embodiments, the connections between the glyphs are formed by contact of adjacent ligatures. The ligatures of the lower case glyphs and upper case script glyphs are customized by a programmer or by a suitable algorithm to end at the same point, as is known in the art. Optionally, connections can be made with connector libraries, curve-fitting algorithms, ligature appearance averaging techniques, or other techniques known in the art.

The embodiments described in detail above relate primarily to font mapping that is sensitive to adjacent character type (i.e., 1, 2, 3, . . . , a, b, c, . . . ); however, the techniques of this invention can be readily implemented to be sensitive to the font, font size, or other measurable attribute of adjacent characters. For instance, the program could be easily modified to determine the presence or absence of larger or smaller font sizes, and to map to certain glyph sets for each class of adjacent font sizes. Similarly, font types could likewise be used to trigger and control remapping operations.

Naturally, the technique of this invention need not be used in connection with handwritten glyphs. Rather, fonts of any desired configuration could be mapped to a character string based on the attributes of adjacent character strings. As an example the protocol of this invention could be used to vary the height or size of each character so that it deviates from the characters adjacent to it.

Moreover, there is no requirement that only immediately adjacent characters be observed in selecting the font to which a character is to be mapped. At the cost of additional processing time, the program can be modified to look for glyph similarities or other format parameters within any desired distance of the character being remapped.

The preferred embodiments have been described in the context of "mapping" or "remapping." However, it is not necessary that the method of the invention be implemented in connection with an operation conventionally understood as "mapping." Rather, the technique is useful for any generation, assignment or determination of fonts based on the attributes of proximate characters and the like.

As mentioned above, the techniques taught herein can be readily combined with other conversion and formatting systems. Variable baseline techniques, connector library techniques, curve fitting algorithm techniques, and library string techniques, by way of example, can be advantageously combined with the context-sensitive font generation disclosed herein to obtain an optimally realistic handwriting font. Whether or not the present invention is used with handwriting fonts, it can be advantageously implemented with conversion functions that modified other paragraph parameters, such as compression and expansion of spaces, justification, line spacing, and the like.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

Figure 3:
FIG. 3 is a representative text string prior to conversion according to the algorithm of FIG. 2.

FIGS. 3–4 are representative text strings prior to and after conversion with the context-sensitive algorithm of FIG. 2. The input strings 300 shown in FIG. 3 consist of a series of words separated by spaces and punctuation. The words have initial lower case and capital letters. The words 300 also include acronyms. After conversion, each character has been assigned a new font depending on what characters surround it, as shown at element 400 in FIG. 4. Capital letters that mark the beginning of a sentence have been converted into upper case script. Lower case letters that mark the start of a word have been converted into glyphs in the initial lower case character set. Lower case letters in the middle of words have been randomly converted into glyphs from one of the three middle lower case character sets. Consecutive middle lower case letters, such as the two P's in "happy," have been converted such that they do not have the same randomly assigned glyph from the three middle lower case character sets. Acronyms have been converted into glyphs from the upper case printed character set.

A number of embodiments of the present invention have been described. Nevertheless, it will be understood that various modifications may be made without departing from the spirit and scope of the invention. Accordingly, other embodiments are within the scope of the following claims.

What is claimed is:

1. A computer program product, tangibly stored on a computer-readable medium, for context-sensitive font generation, comprising instructions operable to cause programmable processors to:
   (a) identify a character string including at least upper case, lower case, or symbolic characters;
   (b) identify a character in the string;
   (c) identify a plurality of glyphs corresponding to the character; and
   (d) selectively apply a cursive or non-cursive glyph to the character based upon the case of at least one adjacent character in the string.

2. The computer program product of claim 1, further comprising instructions to select an upper case printed glyph where an adjacent character is also upper case.

3. The computer program product of claim 1, further comprising instructions to randomly select from a plurality of lower case glyphs corresponding to a character.

4. The computer program product of claim 1, further comprising instructions to select a glyph associated with a quotation mark based upon the presence or absence of spaces or characters preceding and succeeding the quotation mark.

5. A computer program product, tangibly stored on a computer-readable medium, for context-sensitive font generation, comprising instructions operable to cause programmable processors to:
   (a) identify a character string including at least upper case, lower case, or symbolic characters having an associated font;
   (b) identify a character in the string;
   (c) identify a plurality of alternate fonts corresponding to the character; and
   (d) selectively apply a cursive or non-cursive alternate font to the character based upon the case of at least one adjacent character in the string.

6. The computer program product of claim 5, wherein the alternate fonts are handwriting glyphs.

7. The computer program product of claim 5, further comprising instructions to output to a word processing program a string comprising remapped characters.

8. The computer program product of claim 5, wherein the characters in the string, prior to conversion, have the same font.

9. The computer program product of claim 5, wherein the alternate font is an upper case printed font which is selected based on the presence of an adjacent upper case character.

10. The computer program product of claim 5, wherein the alternate font is a lower case font randomly selected from a plurality of lower case fonts corresponding to the character.

11. The computer program product of claim 5, wherein the alternate font is an arcuate quotation mark which is selected based upon the presence of adjacent spaces or adjacent characters.

12. The computer program product of claim 5, wherein the alternate fonts are contained in a conversion table.

13. The computer program product of claim 12, further comprising instructions to create the conversion table.

14. A method for context-sensitive font generation, comprising the steps of:
   (a) identifying a character string including at least upper case, lower case, or symbolic characters having an associated font;
   (b) identifying a character in the string;
   (c) identifying a plurality of alternate fonts corresponding to the character; and
   (d) selectively applying a cursive or non-cursive alternate font to the character based upon case of at least one adjacent character in the string.

15. The method of claim 14, wherein the alternate fonts are handwriting glyphs.

16. The method of claim 14, further comprising the step of outputting to a word processing program a string comprising remapped characters.

17. The method of claim 14, wherein the alternate font is selected based upon the identity or font of preceding and succeeding characters in the string.

18. The method of claim 14, wherein the characters in the string, prior to conversion, have the same font.

19. The method of claim 14, wherein the alternate font is an upper case printed font which is selected based on the presence of an adjacent upper case character.

20. The method of claim 14, wherein the alternate font is a lower case font randomly selected from a plurality of lower case fonts corresponding to the character.

21. The method of claim 14, wherein the alternate font is an arcuate quotation mark which is selected based upon the presence of adjacent spaces or adjacent characters.

22. The method of claim 14, wherein the alternate fonts are contained in a conversion table.

23. The method of claim 22, further comprising the step of creating the conversion table.

24. The computer program product of claim 1, wherein a preceding or succeeding character is a blank space.

25. The computer program product of claim 1, further comprising instructions to selectively apply a cursive or non-cursive glyph to the character based upon preceding and succeeding characters in the string.

26. The computer program product of claim 3, further comprising instructions to determine whether the randomly selected glyph is equal to a glyph selected for an immediately preceding character, and if so, repeating the random selection until the randomly selected glyph is not equal to the glyph selected for the immediately preceding character.

* * * * *